United States Patent
Kazmi et al.

(10) Patent No.: US 12,126,172 B2
(45) Date of Patent: Oct. 22, 2024

(54) SYSTEMS AND METHODS FOR REACTOR POWER FLOW MANAGEMENT FOR SYSTEM STABILITY

(71) Applicant: Schweitzer Engineering Laboratories, Inc., Pullman, WA (US)

(72) Inventors: Maaz Syed Muhammad Kazmi, Richmond, TX (US); Pradeep Varma Sangaraju, Pullman, WA (US); Ashish Upreti, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 389 days.

(21) Appl. No.: 17/411,274

(22) Filed: Aug. 25, 2021

(65) Prior Publication Data
US 2023/0061694 A1 Mar. 2, 2023

(51) Int. Cl.
*H02J 3/14* (2006.01)
*H02J 3/16* (2006.01)
*H02J 3/38* (2006.01)

(52) U.S. Cl.
CPC ............ *H02J 3/144* (2020.01); *H02J 3/16* (2013.01); *H02J 3/381* (2013.01); *H02J 3/388* (2020.01)

(58) Field of Classification Search
CPC .... H02J 3/144; H02J 3/16; H02J 3/381; H02J 3/388; H02J 3/14; H02J 3/38; H02J 3/06; Y02E 40/30
See application file for complete search history.

(56) References Cited

U.S. PATENT DOCUMENTS

| | | | |
|---|---|---|---|
| 8,965,592 B2 | 2/2015 | Manson | |
| 9,008,850 B2 | 4/2015 | Manson | |
| 10,310,480 B2 | 6/2019 | Manson | |
| 10,476,268 B2 | 11/2019 | Gubba Ravikumar | |
| 10,931,109 B2 | 2/2021 | Cai | |
| 11,009,931 B2 | 5/2021 | Khatib | |
| 11,038,352 B1 | 6/2021 | Khatib | |
| 11,146,193 B2 | 10/2021 | Manson | |
| 2012/0053744 A1 | 3/2012 | Manson | |
| 2013/0018521 A1 | 1/2013 | Manson | |
| 2014/0022680 A1* | 1/2014 | Berggren | H02H 7/268 361/87 |
| 2014/0188300 A1* | 7/2014 | Nguyen | H02J 3/381 700/297 |
| 2015/0222123 A1 | 8/2015 | Manson | |

(Continued)

FOREIGN PATENT DOCUMENTS

WO    WO-2015130289 A1 *   9/2015   ............ H02J 3/1842

*Primary Examiner* — Mohammad Ali
*Assistant Examiner* — Dhruvkumar Patel
(74) *Attorney, Agent, or Firm* — Fletcher Yoder, P.C.

(57) ABSTRACT

An electric power delivery system may include a number of electric power generators and loads distributed across a number of islands (e.g., branches). The electric power delivery system may also include reactors between each two islands of the electric power delivery system that may allow current flow between the islands. However, excessive current flow across the reactors may cause system failure and is undesirable. Accordingly, systems and methods are described to control reactive power and active power generation and consumption of the electric power delivery system to reduce (e.g., minimize) the current flow across the reactors.

20 Claims, 4 Drawing Sheets

(56) References Cited

U.S. PATENT DOCUMENTS

| | | | | |
|---|---|---|---|---|
| 2016/0118878 A1* | 4/2016 | Alteneiji | ............... | H02J 3/1821 |
| | | | | 323/205 |
| 2016/0363949 A1* | 12/2016 | Zimmanck | ................ | H02J 3/32 |
| 2017/0003701 A1* | 1/2017 | Miller | ................ | G05B 19/0428 |
| 2017/0163037 A1* | 6/2017 | Zimmanck | .............. | H02J 3/381 |
| 2017/0187188 A1* | 6/2017 | Aubert Guyon | ........ | H02M 7/44 |
| 2017/0250540 A1* | 8/2017 | Varma | ....................... | H02J 3/46 |
| 2017/0306928 A1* | 10/2017 | Tahata | ..................... | H02J 3/46 |
| 2018/0233911 A1* | 8/2018 | Rosendahl | .............. | H02J 3/388 |
| 2018/0278088 A1* | 9/2018 | Toyoda | .................... | H02J 3/18 |
| 2018/0301980 A1* | 10/2018 | Keister | ................. | H02M 1/088 |
| 2019/0207376 A1* | 7/2019 | Weon | ........................ | H02J 3/38 |
| 2019/0252883 A1 | 8/2019 | Gubba Ravikumar | | |
| 2020/0026337 A1 | 1/2020 | Khatib | | |
| 2020/0227915 A1 | 7/2020 | Cai | | |
| 2021/0083477 A1* | 3/2021 | Metcalfe | ............ | G01R 19/2513 |
| 2021/0111651 A1 | 4/2021 | Manson | | |
| 2021/0159700 A1 | 5/2021 | Khatib | | |

* cited by examiner

SYSTEMS AND METHODS FOR REACTOR POWER FLOW MANAGEMENT FOR SYSTEM STABILITY

BACKGROUND FIELD

The present disclosure relates generally to power flow management in electric power delivery systems and, more particularly, to monitoring and control systems that prevents overloading of current limiting reactors of the electric power delivery system.

Electric power delivery systems (e.g., macrogrids) are used to transmit electric power from generators to loads. For example, an electric power delivery system may include a number of microgrids connected using reactors. Imbalanced electric power generation or consumption between different microgrids of the electric power delivery system may cause current flow through the reactors to balance the electric power delivery system. For example, excessive electric power generation in a microgrid, excessive electric power consumption in a microgrid, failure in different components of the electric power delivery system, among other possibilities, may cause an imbalance in the electric power delivery system. However, overloading a reactor may result in reduced lifecycle of the reactor and other components of the electric power delivery system.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

Figure 1:
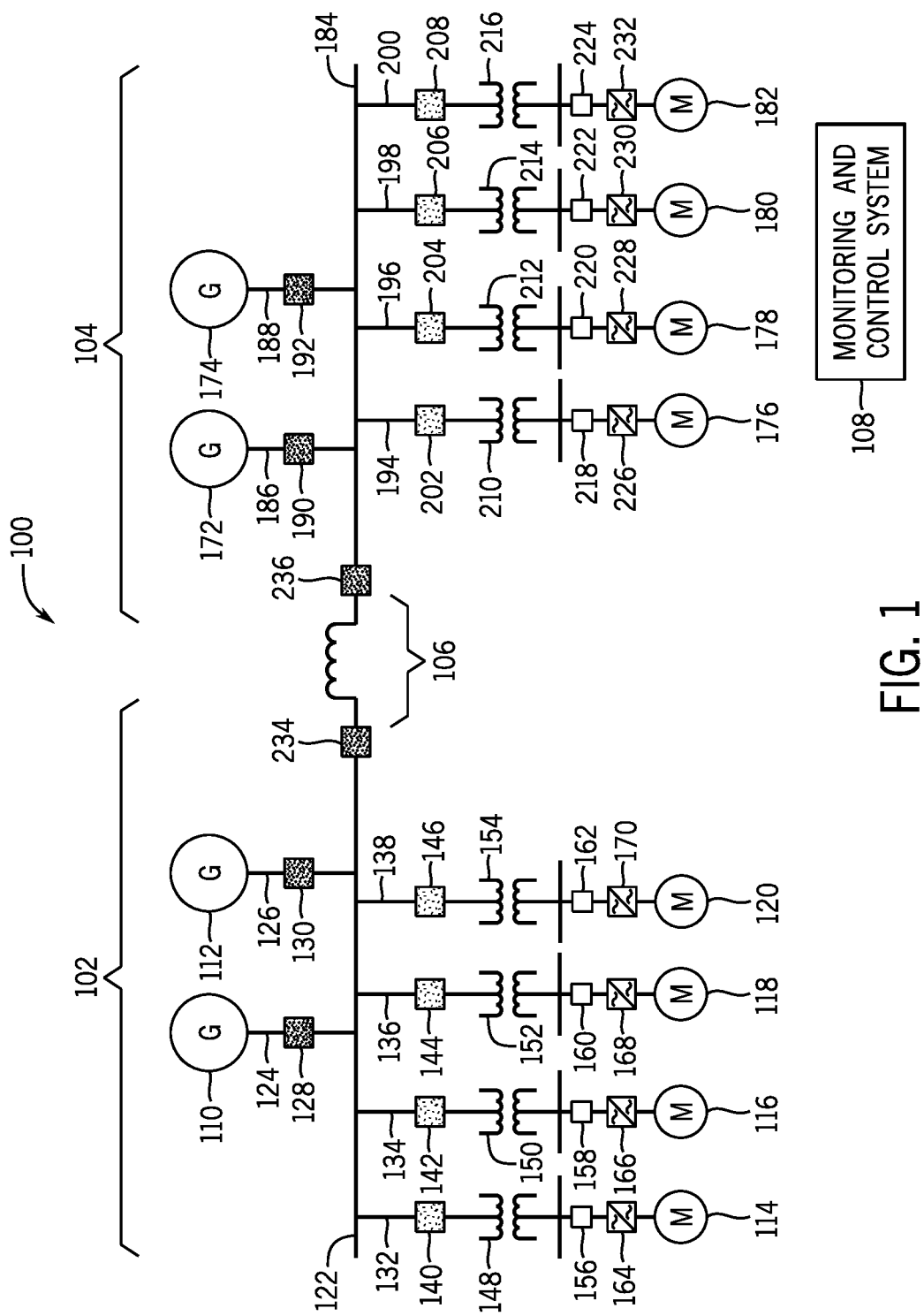
FIG. 1 depicts a schematic of an electric power delivery system including a monitoring and control system that controls current flow across a reactor disposed between a first island and a second island of the electric power delivery system, in accordance with an embodiment.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electric power delivery systems are used to transmit electric power from generators to loads. For example, an electric power delivery system may include a number of generators and loads distributed along one or more power transmission buses. Each power transmission bus (e.g., voltage bus) with one or more generators or loads connected thereto may be referred to as an island (e.g., a branch). For example, a powergrid (e.g., macrogrid) may include a number of islands (e.g., microgrids). As such, different electric power delivery systems may include different numbers of islands.

An electric power delivery system may also include a reactor positioned between two islands. The reactor may connect a first power transmission bus of a first island with a second power transmission bus of a second island. In different embodiments, each island of an electric power delivery system may electrically couple one or multiple other islands of the electric power delivery system using reactors arranged in a loop architecture or in a series architecture.

That said, each island of the electric power delivery system may generate and consume electric power in proportion. That is, each island may be electrically balanced and the electrical power delivery system may be stable. However, in some practical applications, an island may generate more electric power than it consumes or demand more electric power than it generates. For example, such island may have experienced a component failure. Moreover, in some embodiments, the electric power delivery system may organically grow by implementing additional islands with different voltage levels on respective power transmission buses. In such embodiments, a reactor may allow current flow between the power transmission bus of different islands to stabilize electric power transmission of the electric power delivery system.

The electric power delivery system may include a monitoring and control system. The monitoring and control system may receive electrical measurements of the electric power delivery system and provide control signals to different components within the electric power delivery system. In some embodiments, the monitoring and control system may send the control signals to generators and loads to adjust the power generation or power consumption of one or more islands and maintain stability of the electric power delivery system. For example, the monitoring and control system may take one or more control actions when a new equipment (e.g., generators or loads) is added to an existing electric power delivery system, an equipment experiences failure, or a topology change occurs in the electric power delivery system.

With the foregoing in mind, the reactors of the electric power delivery system may each operate according to specific current flow ratings. That is, each reactor may overload or fail when a current outside a respective current flow ratings flows through the reactor. Accordingly, maintaining the current flow across each of the reactors within the current flow ratings of the respective reactor may prevent overloading a reactor beyond the respective current flow ratings. As such, the monitoring and control system may control the electric power delivery system to reduce (e.g., minimize) the current flow across the reactors. In some embodiments, the monitoring and control system may control the power generation and power consumption of the islands to electrically balance the islands such that the electrical power delivery system becomes balanced.

The monitoring and control system may monitor the current flow across a reactor by receiving one or more signals indicative of active power measurements, reactive power measurements, or both, on two sides of the reactor. Subsequently, the monitoring and control system may calculate the current flow across the reactor based on the received signals. In some embodiments, the monitoring and control system may receive one or more signals indicative of current flow measurements across the reactor. Based on the calculated or measured current flow across the reactor, the monitoring and control system may determine to control to one or more components of islands on either or both sides of the reactor.

For example, the monitoring and control system may determine that electric power generation and electric power consumption of the islands on either or both sides of the reactor are unbalanced. Accordingly, the monitoring and control system may provide control signals to balance electric power generation and electric power consumption of the islands on either or both side of the reactor to stabilize the electric power delivery system and reduce (e.g., minimize) the current flow across the reactor. In some embodiments, the monitoring and control system may provide the control signals to control reactive power generation and reactive power consumption of either or both islands. Accordingly, the monitoring and control system may reduce (e.g., minimize) current flow across the reactors by controlling reactive power flow across the reactors. Moreover, in specific embodiments, the monitoring and control system may provide the control signals to control reactive power generation and consumption, as well as active power generation and consumption of either or both islands.

The electric power delivery system may benefit from increased control flexibility when controlling reactive power of the system in addition or alternative to controlling active power of the system. Moreover, the electric power delivery system may also benefit from increased control flexibility when controlling power consumption of the system in addition or alternative to controlling power generation of the system. Such control schemes may prevent load shedding or generator run-back when the electric power delivery system is not stabilized. As such, using control interfaces and schemes for controlling the reactive power generation and consumption of the system in addition or as an alternative scheme than controlling the active power generation and consumption of the system may increase reliability and flexibility of the system.

Referring now to FIG. 1, a schematic of an electric power delivery system 100 is depicted. The electric power delivery system 100 may transmit power from generation to load using the depicted components. The electric power delivery system 100 may include a first island 102 and a second island 104 connected via a reactor 106. The electric power delivery system 100 may also include a monitoring and control system 108 to monitor and control the power transmission of the electric power delivery system 100.

As such, the monitoring and control system 108 may receive one or more electrical measurements from various monitoring devices in the electric power delivery system 100. The monitoring and control system 108 may also send control signals to one or more components of the electric power delivery system 100 to control power transmission from generation to load (e.g., power flow). In some embodiments, the monitoring and control system 108 may prevent the electric power delivery system 100 from overloading by balancing the power transmission of the first island 102 and the second island 104. While two islands (the first island 102 and the second island 104) are shown in FIG. 1, it should be appreciated that there may be more than two islands. Moreover, each island may contain more or fewer components than those shown here by way of example.

The first island 102 may include generators 110 and 112, and loads 114, 116, 118, and 120 connected to a first voltage bus 122. The generators 110 and 112 may generate power including active power and reactive power. Moreover, the loads 114, 116, 118, and 120 of the first island 102 may consume the generated active power and the generated reactive power. The generators 110 and 112 may be connected to the first voltage bus 122 via respective voltage lines 124 and 126 and through circuit breakers 128 and 130 positioned on the respective voltage lines 124 and 126. Moreover, the loads 114, 116, 118, and 120 may be connected to the first voltage bus 122 via respective voltage lines 132, 134, 136, and 138 and through circuit breakers 140, 142, 144, and 146, current transformers 148, 150, 152, and 154, power adjustment components 156, 158, 160, and 162, and active front end (AFE) circuitry 164, 166, 168, and 170 positioned on the respective voltage lines 132, 134, 136, and 138.

Similarly, the second island 104 may include generators 172 and 174 and the loads 176, 178, 180, and 182 connected to a second voltage bus 184. The generators 172 and 174 of the second island 104 may generate power including active power and reactive power. Moreover, the loads 176, 178, 180, and 182 of the second island 104 may consume the generated active power and the generated reactive power. The generators 172 and 174 of the second island 104 may be connected to the second voltage bus 184 via respective voltage lines 186 and 188 and through circuit breakers 190 and 192 positioned on the respective voltage lines 186 and 188. Moreover, the loads 176, 178, 180, and 182 may be connected to the second voltage bus via respective voltage lines 194, 196, 198, and 200 and through circuit breakers 202, 204, 206, and 208, current transformers 210, 212, 214, and 216, power adjustment components, 218, 220, 222, and 224, and AFE circuitry 226, 228, 230, and 232 positioned on the respective voltage lines 194, 196, 198, and 200. Furthermore, the second voltage bus 184 and the first voltage bus 122 may be electrically connected via the reactor 106.

In some embodiments, the monitoring and control system 108 may open or close each of the circuit breakers 128, 130, 140, 142, 146, 190, 192, 202, 204, 206, and 208 to control the reactive (and active) power generation and consumption of the electric power delivery system 100. For example, during overcurrent conditions, the monitoring and control system 108 may generate and transmit control signals to trip (open) one or more of the circuit breakers 128, 130, 140, 142, 146, 190, 192, 202, 204, 206, and 208 to disconnect the generators 110, 112, 172, and 174 or the loads 114, 116, 118, 120, 176, 178, 180, and 182. In specific embodiments, the monitoring and control system 108 may generate and transmit such signals based on receiving inputs from the current transformers 148, 150, 152, 154, 210, 212, 214, and 216.

The current transformers 148, 150, 152, 154, 210, 212, 214, and 216 may provide measurement of current flow through the respective voltage lines 132, 134, 136, 138, 194, 196, 198, and 200 to the monitoring and control system 108. The monitoring and control system 108 may use such current flow measurements to open or close one or more of the circuit breakers 140, 142, 144, 146, 202, 204, 206, and 208 associated with the loads 114, 116, 118, 120, 176, 178, 180, and 182 or circuit breakers 128, 130, 190, and 192 associated with the generators 110, 112, 172, and 174. For example, the monitoring and control system 108 may trip a circuit breaker (e.g., circuit breaker 140, 142, 144, 146, 202, 204, 206, and 208) associated with a respective load (e.g., load 114, 116, 118, 120, 176, 178, 180, or 182) with high current measurements to prevent overloading the respective load. Similarly, the monitoring and control system 108 may also open or close one or more of the circuit breakers 128, 130, 190, and 192 associated with one or more generators 110, 112, 172, and 174 to prevent overloading different components of the electric power delivery system 100.

Moreover, the monitoring and control system 108 may receive measurements indicative of reactive power generated by the generators 110, 112, 172, and 174, reactive power delivered to the loads 114, 116, 118, 120, 176, 178, 180, and 182, and reactive power at a first side 234 and a second side 236 of the reactor 106. In some embodiments, the monitoring and control system 108 may receive current measurements or voltage measurements of different components and translate such measurements to reactive power measurements. Subsequently, the monitoring and control system 108 may provide the control signals to respective controllers (e.g., governors, exciters) of one or more of the generators 110, 112, 172, and 174 or controllers of one or more loads 114, 116, 118, 120, 176, 178, 180, and 182 to adjust the reactive power generation and the reactive power consumption of the electric power delivery system 100. As discussed above, adjusting reactive power flow by controlling the reactive power generation and reactive power consumption may allow flexible power flow adjustment of the electric power delivery system 100. A control scheme is discussed in more detail below.

With the foregoing in mind, the monitoring and control system 108 may provide the control signals to maintain a current flow through the reactor 106 within operating limits (e.g., ratings) of the reactor 106. For example, the monitoring and control system 108 may provide the control signals in response to determining that the current flow through the reactor 106 exceeds a current threshold. The current threshold may be based on the operating limits of the reactor 106. Accordingly, the monitoring and control system 108 may provide the control signals to reduce a current flow through the reactor 106 by stabilizing the electric power delivery system 100. In some embodiments, the monitoring and control system 108 may provide the control signals to the AFE circuitry 164, 166, 168, 170, 226, 228, 230, and 232 and the power adjustment components 156, 158, 160, 162, 218, 220, 222, and 224 to adjust the reactive power consumption of one or multiple loads 114, 116, 118, 120, 176, 178, 180, and 182 in granular levels. Moreover, the monitoring and control system 108 may adjust the reactive power consumption of each of the loads 114, 116, 118, 120, 176, 178, 180, and 182 in granular levels using respective operating limits of each of the load 114, 116, 118, 120, 176, 178, 180, and 182.

As described above, in specific embodiments, the monitoring and control system 108 may provide the control signals to the respective controllers of the generators 110, 112, 172, and 174. As such, the monitoring and control system 108 may adjust the reactive power generation of one or more of the generators 110, 112, 172, and 174 in granular levels using the respective operating limits of the generators 110, 112, 172, and 174. Using such a control scheme, the monitoring and control system 108 may maintain a reduced (e.g., minimum) current flow through the reactor 106 while the generators 110, 112, 172, and 174 and the loads 114, 116, 118, 120, 176, 178, 180, and 182 may operate within the respective operating limits. As such, the monitoring and control system 108 may prevent overloading the reactor 106 with high current flow.

In one embodiment, AFE circuitry 164, 166, 168, 170, 226, 228, 230, and 232 may control reactive power flow through the power adjustment components 156, 158, 160, 162, 218, 220, 222, and 224 to control the reactive power consumption of the loads 114, 116, 118, 120, 176, 178, 180, and 182. For example, the monitoring and control system 108 may provide the control signals to the AFE circuitry 164, 166, 168, 170, 226, 228, 230, and 232 to adjust the reactive power consumption of the loads 114, 116, 118, 120, 176, 178, 180, and 182. As such, in different embodiments, the monitoring and control system 108 may reduce or increase reactive power flow through one or more of the power adjustment components 156, 158, 160, 162, 218, 220, 222, and 224 to balance the reactive power generation and consumption of the first island 102, the second island 104, or both, and stabilize the power delivery system 100. In specific embodiments, the AFE circuitry 164, 166, 168, 170, 226, 228, 230, and 232 may also provide electrical measurements, such as reactive power consumption, associated with the loads 114, 116, 118, 120, 176, 178, 180, and 182, to the monitoring and control system 108. That said, the monitoring and control system 108 may also control the generators 110, 112, 172, and 174 by providing the control signals to the respective controllers of the generators 110, 112, 172, and 174.

In some embodiments, the monitoring and control system 108 may detect a high differential reactive power between the first side 234 and the second side 236 of the reactor 106. As discussed above, such detection may be based on receiving different measurements associated with different components of the electric power delivery system 100. This could cause a higher current than desired to flow through the reactor 106 from the first island 102 to the second island 104. The monitoring and control system 108 may generate and transmit (e.g., provide) control signals to one or more of the AFE circuitry 164, 166, 168, 170, 226, 228, 230, and 232 associated with respective power adjustment components of the loads 114, 116, 118, 120, 176, 178, 180, and 182. As such, the monitoring and control system 108 may reduce the differential reactive power between the first side of the reactor 106 and the second side of the reactor 106 and stabilize the electric power delivery system 100.

To stabilize the electric power delivery system 100, the monitoring and control system 108 may provide the control signals to increase reactive power consumption on the first island 102 and decrease reactive power consumption on the second island 104. As such, the control signals may increase a reactive power flow through one or more of the power adjustment components of the first island 102 while decreasing a reactive power flow through one or more of the power adjustment components of the second island 104. As such, the monitoring and control system 108 may stabilize the electric power delivery system 100 and reduce (e.g., minimize) the current flow through the reactor 106.

Additionally, the monitoring and control system 108 may also generate and transmit control signals to the controllers of the generators 110 and 112 to reduce the reactive power generation of the first island 102 while increasing the reactive power generation of the second island 104 (e.g., the generators 172 or 174). As such, the electric power delivery system 100 may become stable while operating within operating ratings of the reactor 106, the generators 110, 112, 172, and 174, and the loads 114, 116, 118, 120, 176, 178, 180, and 182. Moreover, it should be appreciated that in different embodiments, the monitoring and control system 108 may control the reactive power generation and consumption of the electric power delivery system 100 based on different preferences. For example, the monitoring and control system 108 may control the reactive power generation and consumption of the generators 110, 112, 172, and 174 or the loads 114, 116, 118, 120, 176, 178, 180, and 182 based on a user provided preference or a system imposed requirement.

That said, it should also be appreciated that making control decisions based on reactive power, without considering active power, may result in voltage variations on the electric power delivery system 100. For example, current flow from the first island 102 to the second island 104 may cause the first island 102 to lose both active and reactive power provided by the generators 110 and 112. Following the loss of the active power and reactive power from the generators 110 and 112, adjusting a reactive power delivered to the loads 114, 116, 118, and 120 may leave a deficiency or excess of active power in the first island 102.

For instance, losing reactive power generation without a corresponding amount of reduction in reactive power consumption may cause voltages on one or more buses in the electric power delivery system 100 to decrease due to a difference between reactive power being demanded and reactive power being delivered. Depending on the extent of the difference (e.g., deficiency or excess) between power supply and power demand, various bus voltages of the electric power delivery system 100 may decrease or increase beyond desired operating limits, causing voltage protection trips and/or voltage collapses to occur. As such, the monitoring and control system 108 may consider active power changes when regulating reactive power transmission.

Figure 2:
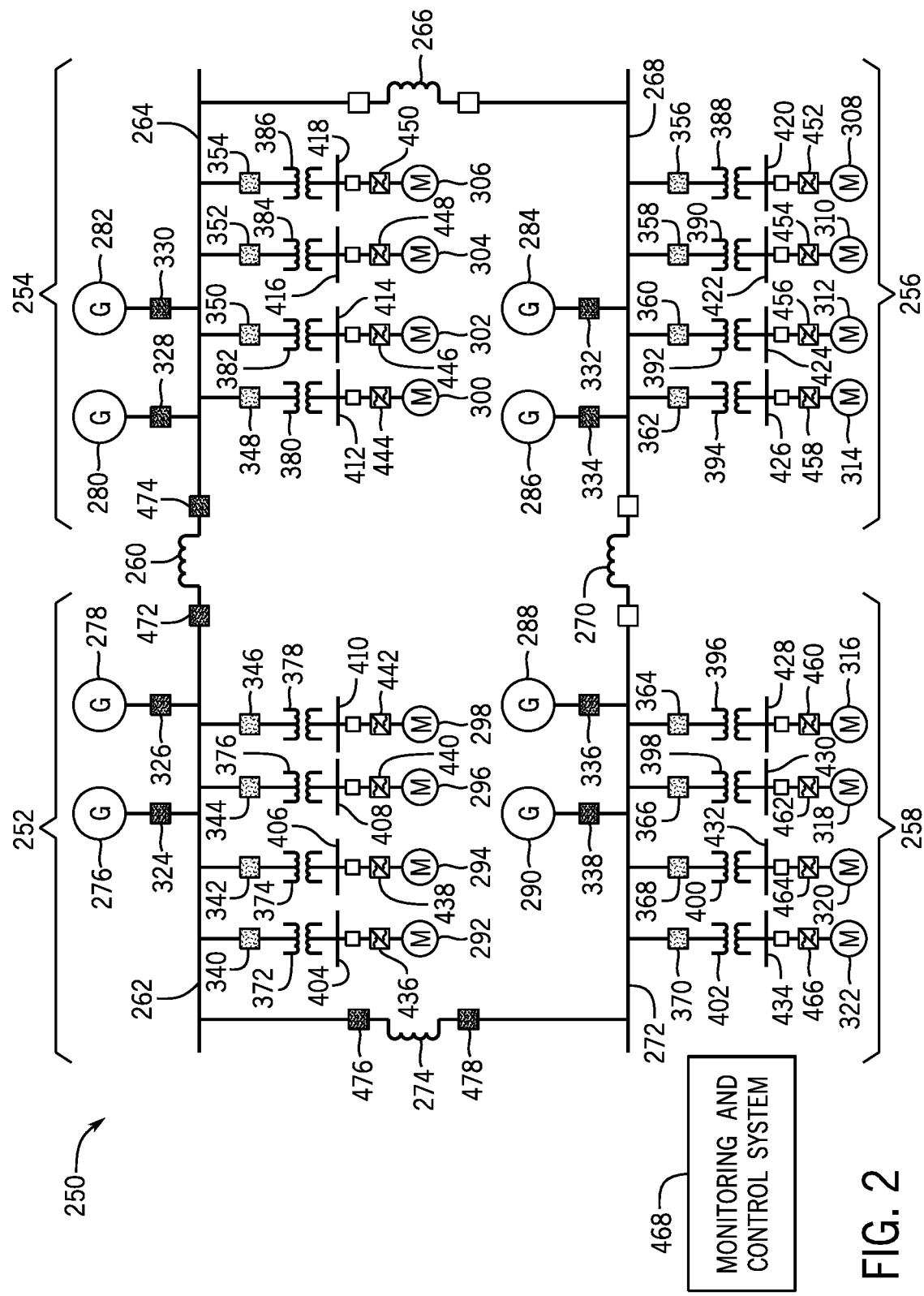
FIG. 2 depicts a schematic of an electric power delivery system including a monitoring and control system that controls current flow across multiple reactors disposed between a multiple islands of the electric power delivery system, in accordance with an embodiment.

Any suitable number of islands may be used. With the foregoing in mind, FIG. 2 depicts a schematic of an electric power delivery system 250 including four islands. The depicted embodiment of the electric power delivery system 250 includes a first island 252, a second island 254, a third island 256, and a fourth island 258. The first island 252 and the second island 254 are electrically connected using a first reactor 260 disposed between a first voltage bus 262 of the first island 252 and a second voltage bus 264 of the second island 254. Moreover, the second island 254 and the third island 256 are electrically connected using a second reactor 266 disposed between the second voltage bus 264 of the second island 254 and a third voltage bus 268 of the third island 256. The third island 256 and the fourth island 258 are electrically connected using a third reactor 270 disposed between the third voltage bus 268 of the third island 256 and a fourth voltage bus 272 of the fourth island 258. Similarly, the fourth island 258 and the first island 252 are electrically connected using a fourth reactor 274 disposed between the fourth voltage bus 272 of the fourth island 258 and the first voltage bus 262 of the first island 252.

In different embodiments, the islands 252, 254, 256, and 258 may include different components. In the depicted embodiment of FIG. 2, similar to FIG. 1, the islands 252, 254, 256, and 258 may include generators 276, 278, 280, 282, 284, 286, 288, and 290, loads 292, 294, 296, 298, 300, 302, 304, 306, 308, 310, 312, 314, 316, 318, 320, and 322, circuit breakers 324, 326, 328, 330, 332, 334, 336, 338, 340, 342, 344, 346, 348, 350, 352, 354, 356, 358, 360, 362, 364, 366, 368, and 370, current transformers 372, 374, 376, 378, 380, 382, 384, 386, 388, 390, 392, 394, 396, 398, 400, and 402, power adjustment components 404, 406, 408, 410, 412, 414, 416, 418, 420, 422, 424, 426, 428, 430, 432, and 434, and AFE circuitry 436, 438, 440, 442, 444, 446, 448, 450, 452, 454, 456, 458, 460, 462, 464, and 466. The electric power delivery system 250 may also include a monitoring and control system 468. In some embodiments, the monitoring and control system 468 may be similar to the monitoring and control system 108 of FIG. 1. Accordingly, the monitoring and control system 468 may generate and transmit control signals to one or multiple components of the electric power delivery system 250. Moreover, the monitoring and control system 468 may balance power generation and consumption of each of the islands to stabilize the electrical power delivery system.

In some embodiments, a voltage level of the first voltage bus 262 (of the first island 252) may be higher than a voltage level of the second voltage bus 264 (of the second island 254), the third voltage bus 268 (of the third island 256), and the fourth voltage bus 272 (of the fourth island 258). In one example, the first island 252, the second island 254, the third island 256, and the fourth island 258 may be deployed using different power generation and consumption rates. In another example, a defect in power generation or delivery in one or multiple components of each of the islands 252, 254, 256, and 258 may cause such voltage level discrepancies. As such, the monitoring and control system 468 may provide the control signals to stabilize the electric power delivery system 250 by adjusting reactive power generation and reactive power consumption on one or more of the islands 252, 254, 256, and 258. In specific embodiments, the monitoring and control system 468 may also adjust active power generation and active power consumption of one or more of the islands 252, 254, 256, and 258.

Nevertheless, due to the higher voltage level of the first voltage bus 262, a first overflow current may flow between the first voltage bus 262 and the second voltage bus 264 through the first reactor 260 and a second overflow current may flow between the first voltage bus 262 and the fourth voltage bus 272 through the fourth reactor 274. Additionally, in specific embodiments, some overflow current may flow between the second island 254 and the third island 256 through the second reactor 266 and some overflow current may flow between the third island 256 and the fourth island 258 through the third reactor 270. However, the overflow current due to the higher voltage level of the first island 252 may be higher through the first reactor 260 and the fourth reactor 274. As such, the embodiments described below may be with respect to controlling (e.g., reducing) current flow through the first reactor 260 and the fourth reactor 274. That said, in different embodiments, similar or different systems and methods may be used to control the overflow current through the second reactor 266 and the third reactor 270.

A higher differential voltage level between the first voltage bus 262 and the second voltage bus 264 or the first voltage bus 262 and the fourth voltage bus 272 may result in a higher overflow current through the first reactor 260 or the fourth reactor 274. That said, each reactor 260, 266, 270, and 274 may limit the overflow current between the respective islands based on a current rating (e.g., operating limit) of the reactors 260, 266, 270, and 274. However, an overflow current outside (or in some cases near) the current rating of the reactors 260, 266, 270, and 274 may be undesirable. For example, an overflow current higher than or near the current rating of each of the reactors 260, 266, 270, and 274 may cause one or more of the reactors 260, 266, 270, and 274 to trip, one or more of the circuit breakers 324, 326, 328, 330, 332, 334, 336, 338, 340, 342, 344, 346, 348, 350, 352, 354, 356, 358, 360, 362, 364, 366, 368, and 370 to trip, or gradually damage one or more of the reactors 260, 266, 270, and 274, (or other components of the electric power delivery system 250).

As such, the monitoring and control system 468 may maintain the overflow current through the first reactor 260 and the fourth reactor 274 within the respective current limits by adjusting reactive power generation and consumption of the first island 252, the second island 254, and the fourth island 258 to reduce (e.g., minimize) the overflow currents. For example, the monitoring and control system 468 may maintain the overflow current through the first reactor 260 and the fourth reactor 274 below a current threshold. The current threshold for the first reactor 260 and the fourth reactor 274 may be similar or different, for example, based on operating ratings of the reactors. To that end, the monitoring and control system 468 may determine a reactive power on a first side (e.g., the side of the circuit breaker 472) of the first reactor 260, a second side (e.g., the side of the circuit breaker 474) of the first reactor 260, a first side (e.g., the side of the circuit breaker 476) of the fourth reactor 274, and a second side (e.g., the side of the circuit breaker 478) of the fourth reactor 274. Based on the determined reactive powers, the monitoring and control system 468 may determine differential reactive powers between the first side and the second side of the first reactor 260 and the first side and the second side of the fourth reactor 274.

The monitoring and control system 468 may generate and transmit control signals to adjust the reactive power generation and delivery of the generators 276, 278, 280, 282, 288, and 290 and loads 292, 294, 296, 298, 300, 302, 304, 306, 316, 318, 320, and 322 disposed on the first island 252, the second island 254, and the fourth island 258 based on the determined differential reactive powers. In specific embodiments, the monitoring and control system 468 may also consider other factors such as an age of different components, a reactive power rating of different components, or a user preference for generating the control signals. As such, the monitoring and control system 468 may provide the control signals to balance the reactive power generation and delivery of the first island 252, the second island 254, and the fourth island 258 and stabilize the electric power delivery system 250. Accordingly, the monitoring and control system 468 may reduce the overflow current through the first reactor 260 and the fourth reactor 274.

In the described example, the monitoring and control system 468 may generate and transmit the control signals to one or more of the AFE circuitry 436, 438, 440, and 442 of the first island 252 to control the power adjustment components 404, 406, 408, and 410 by increasing the reactive power consumption of the loads 292, 294, 296, and 298 of the first island 252. Additionally or alternatively, the monitoring and control system 468 may generate and transmit control signals to one or more of the AFE circuitry 444, 446, 448, and 450 of the second island 254 or AFE circuitry 460, 462, 464, and 466 of the fourth island 258 to control the respective power adjustment components (e.g., power adjustment components 412, 414, 416, 418, 428, 430, 432, and 434) by reducing the reactive power consumption of one or multiple loads 300, 302, 304, 306, 316, 318, 320, and 322 associated with the second island 254 and the fourth island 258. As such, the monitoring and control system 468 may reduce the current flow through the first reactor 260 and the fourth reactor 274 based on controlling power consumption of loads 292, 294, 296, 298, 300, 302, 304, 306, 316, 318, 320, and 322 positioned on the first island 252, the second island 254, and the fourth island 258.

Additionally or alternatively, the monitoring and control system 468 monitoring and control system 468 may reduce the current flow through the first reactor 260 and the fourth reactor 274 by adjusting the reactive power generation of the first island 252, the second island 254, and the fourth island 258. That is, the monitoring and control system 468 may generate and transmit control signals to the controllers of one or more of the generators 276 and 278 of the first island 252 to reduce the reactive power generation of the first island 252. Moreover, the monitoring and control system 468 may also generate and transmit control signals to the controllers of one or more of the generators 280, 282, 288, and 290 of the second island 254 and the fourth island 258 to reduce the reactive power generation of the second island 254 and fourth island 258.

That said, in different embodiments, the monitoring and control system 468 may adjust reactive power consumption of the islands 252, 254, 256, and 258, active power consumption of the islands 252, 254, 256, and 258, reactive power generation of the islands 252, 254, 256, and 258, reactive power consumption of the islands 252, 254, 256, and 258, or any combination thereof, to balance each of the islands. Moreover, the monitoring and control system 468 may control one or more of the loads 292, 294, 296, 298, 300, 302, 304, 306, 308, 310, 312, 314, 316, 318, 320, and 322 or generators 276, 278, 280, 282, 284, 286, 288, and 290 of each of the islands to stabilize the electric power delivery system 250.

In the above example, using the monitoring and control system 468 with the AFE circuitry 436, 438, 440, 442, 444, 446, 448, 450, 452, 454, 456, 458, 460, 462, 464, and 466 and the power adjustment components 404, 406, 408, 410, 412, 414, 416, 418, 420, 422, 424, 426, 428, 430, 432, and 434 may provide additional control flexibility over the electric power delivery system 250. When stabilizing the power generation and delivery of the electric power delivery system 250, controlling the reactive power consumption of the loads 292, 294, 296, 298, 300, 302, 304, 306, 308, 310, 312, 314, 316, 318, 320, and 322 may prevent maximizing (or minimizing) the power generation of the generators 276, 278, 280, 282, 284, 286, 288, and 290 with respect to their respective power ratings (e.g., maximum and minimum power thresholds). Moreover, controlling the reactive power delivery to the loads 292, 294, 296, 298, 300, 302, 304, 306, 316, 318, 320, and 322 on the first island 252, the second island 254, and the fourth island 258, may increase the flexibility of the monitoring and control system 468. As such, the monitoring and control system 468 may control the voltage on the first voltage bus 262, the second voltage bus 264, and the fourth voltage bus 272, more effectively by increasing or reducing reactive power delivery to the loads 292, 294, 296, 298, 300, 302, 304, 306, 316, 318, 320, and 322 of the first island 252, the second island 254, and the fourth island 258.

That said, controlling reactive power delivery to the loads 292, 294, 296, 298, 300, 302, 304, 306, 308, 310, 312, 314, 316, 318, 320, and 322 of the each of the islands 252, 254, 256, and 258 may be according to pre-set prioritization of the loads 292, 294, 296, 298, 300, 302, 304, 306, 308, 310, 312, 314, 316, 318, 320, and 322. For example, a user may provide preferred settings to the monitoring and control system 468 that may be used for providing reactive power consumption set-points to the AFE circuitry 436, 438, 440, 442, 444, 446, 448, 450, 452, 454, 456, 458, 460, 462, 464, and 466 of the loads 292, 294, 296, 298, 300, 302, 304, 306, 308, 310, 312, 314, 316, 318, 320, and 322. Accordingly, the monitoring and control system 468 may provide control signals according to load priorities and load pre-set reactive power maximum and minimum values when balancing the reactive power flow of the islands 252, 254, 256, and 258.

Moreover, although the above systems and methods are described with respect to controlling the reactive power generation and consumption of the generators 276, 278, 280, 282, 284, 286, 288, and 290 and loads 292, 294, 296, 298, 300, 302, 304, 306, 308, 310, 312, 314, 316, 318, 320, and 322, active power generation and consumption may also be utilized in different embodiments. That is, in different embodiments, the monitoring and control system 468 may adjust active power generation, reactive power generation, active power consumption, reactive power consumption, or any combination thereof, to balance the power flow between the islands 252, 254, 256, and 258 and reduce the current flow through the respective reactors 260, 266, 270, and 274. Controlling the reactive power generation and consumption of the islands in addition to controlling the active power generation and consumption of the islands 252, 254, 256, and 258 may increase control flexibility of the monitoring and control system 468. Moreover, using such control systems may allow using different components of the electric power delivery system 250, such as the reactors 260, 266, 270, and 274, loads 292, 294, 296, 298, 300, 302, 304, 306, 308, 310, 312, 314, 316, 318, 320, and 322, and generators 276, 278, 280, 282, 284, 286, 288, and 290, at their respective power (or current) ratings. An example process of such embodiments may be described with respect to FIG. 3.

Figure 3:
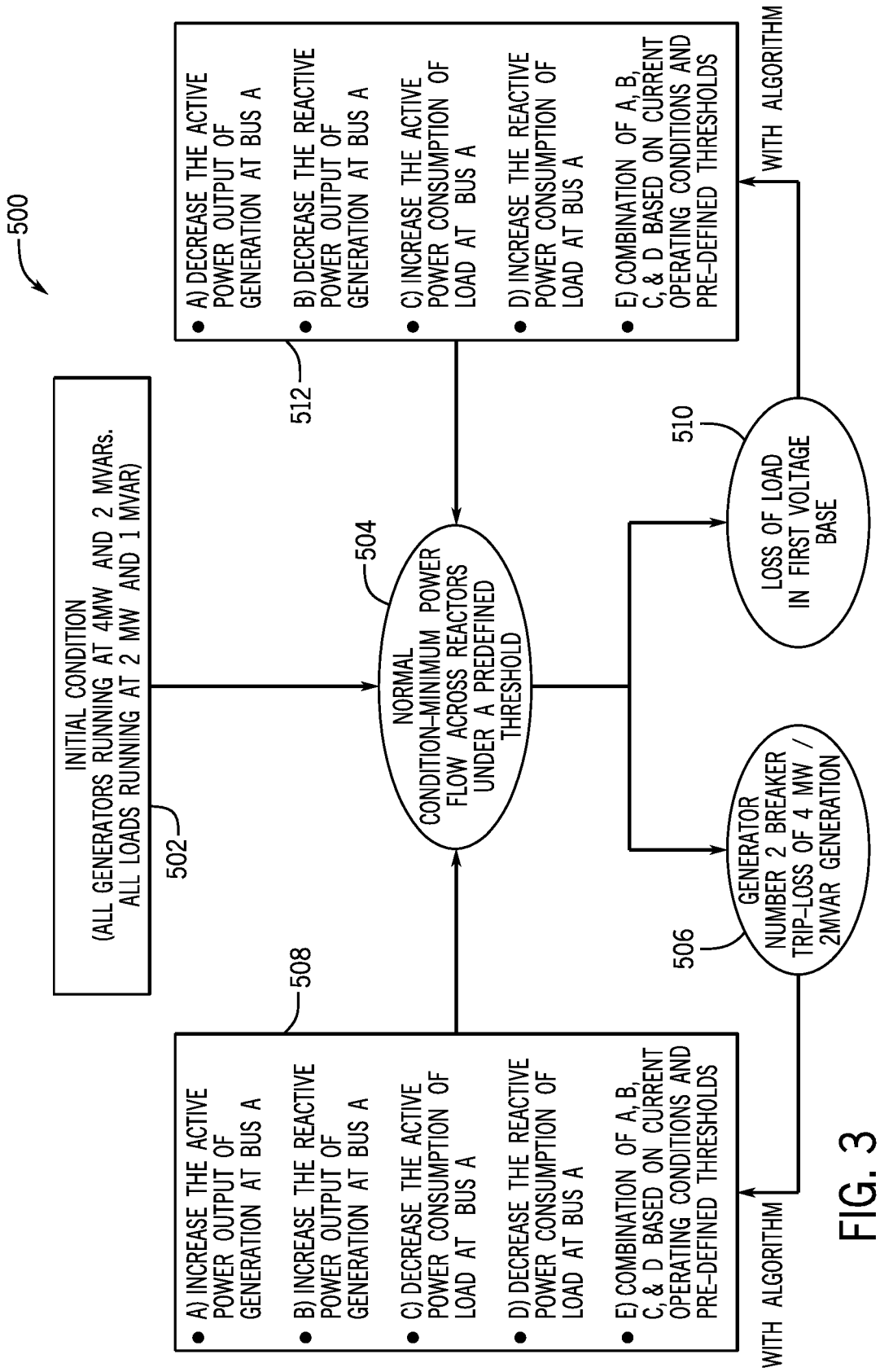
FIG. 3 depicts a flow chart of a process for controlling current flow across reactors of an electric power delivery system, in accordance with an embodiment.

Referring now to FIG. 3, an example process 500 for controlling current flow across reactors of an electric power delivery system (e.g., the electric power delivery system 100 or 250) is depicted. The process 500 may provide control signals to stabilize the electric power delivery system by controlling reactive power generation and delivery of such system. The process 500 may be described with respect to the embodiment of FIG. 2. At block 502, each of the generators 276, 278, 280, 282, 284, 286, 288, and 290 may generate 4 megawatts (MW) of active power and 2 megavars (MVAR) of reactive power at initial condition. As such, the islands 252, 254, 256, and 258 may each generate 8 MWs of active power and 4 MVARs of reactive power. Moreover, each of the loads 292, 294, 296, 298, 300, 302, 304, 306, 308, 310, 312, 314, 316, 318, 320, and 322 may consume 2 MWs of active power and 1 MVAR of reactive power. Accordingly, the islands 252, 254, 256, and 258 may each consume 8 MWs of active power and 4 MVARs of reactive power. That is, each of the islands 252, 254, 256, and 258 may generate and consume a substantially equal amount of active and reactive power and may be initially balanced (also sometimes referred to as stabilized).

At block 504, the electric power delivery system 250 may operate at normal conditions. That is, each of the islands 252, 254, 256, and 258 may generate and consume a balanced amount of active power (e.g., 8 MWs) and reactive power (e.g., 4 MVARs). Accordingly, a reduced (e.g., minimum) power may flow across each of the reactors 260, 266, 270, and 274. In a first embodiment, the circuit breaker 326 of the generator 278 may open (e.g. trip) at block 506. The circuit breaker 326 may trip due to different events, such as overloading or defect. Due to the loss of the generator 278, the first island 252 may produce less power than a total power demanded by the loads 292, 294, 296, and 298 of the first island. For example, the remaining generator 276 of the first island 252 may produce 4 MWs and 2 MVARs of power while the loads 292, 294, 296, and 298 of the first island 252 may demand 8 MWs and 4 MVARs of power.

Subsequently, at block 508, the monitoring and control system 468 may generate and transmit the control signals to adjust a power of the generators 276, 280, 282, 288, and 290, and the loads 292, 294, 296, 298, 300, 302, 304, 306, 316, 318, 320, and 322, disposed on the first island 252, the second island 254, and the fourth island 258 to account for the lost generated power of the generator 278. The monitoring and control system 468 may adjust the power of the generators 276, 280, 282, 288, and 290 and the loads 292, 294, 296, 298, 300, 302, 304, 306, 316, 318, 320, and 322 within the respective operating limits of each of the generators and loads. That said, at the block 508, the monitoring and control system 468 may increase the active power generation of the generator 276 of the first island, increase the reactive power generation of the generator 276 of the first island 252, decrease the active power consumption of the loads 292, 294, 296, and 298 of the first island 252, decrease the reactive power consumption of the loads 292, 294, 296, and 298 of the first island 252, or any combination thereof.

The monitoring and control system 468 may use different instructions to stabilize the electric power delivery system 250 using any combination of the multiple power generation and consumption operations described above. Such instructions may include user imposed preferences or other instructions based on different factors, such as an age of the components of the electric power delivery system 250. Accordingly, the process 500 may return to a normal condition, at the block 504, after stabilizing the electric power delivery system 250 based on the operations of the block 508.

In another example, one or more loads 292, 294, 296, and 298 of the first island 252 may go offline at block 510. As such, the generators 276 and 278 of the first island 252 may produce more power than the remaining loads of the first island 252 may consume. As such, an increased amount of current may pass through the first reactor 260 and the fourth reactor 274, as described with respect to FIG. 2. To reduce the current flow and stabilize the system, the monitoring and control system 468 may generate and transmit control signals to stabilize the electric power delivery system 250 at block 512.

At the block 512, in different embodiments, the monitoring and control system 468 may decrease the active power generation of one or both of the generators 276 and 278 of the first island 252, decrease the reactive power generation of one or both of the generators 276 and 278 of the first island 252, increase the active power consumption of one more of the loads 292, 294, 296, and 298 of the first island 252, increase the reactive power consumption of one more of the loads 292, 294, 296, and 298 of the first island 252, or any combination thereof. Similar to the operations of the block 508, the monitoring and control system 468 may use different instructions to stabilize the electric power delivery system 250 using any combination of the multiple power generation and consumption operations described above. Accordingly, the process 500 may stabilize the electric power delivery system 250 and return the system to normal condition at the block 504.

That said, it should be appreciated that the process 500 of FIG. 3 may be performed in any suitable order. Moreover, different process blocks may be used in different embodiments. Furthermore, the embodiments described with respect to FIGS. 1, 2, and 3 are merely for illustration and other example embodiments may benefit from the described techniques and components.

Figure 4:
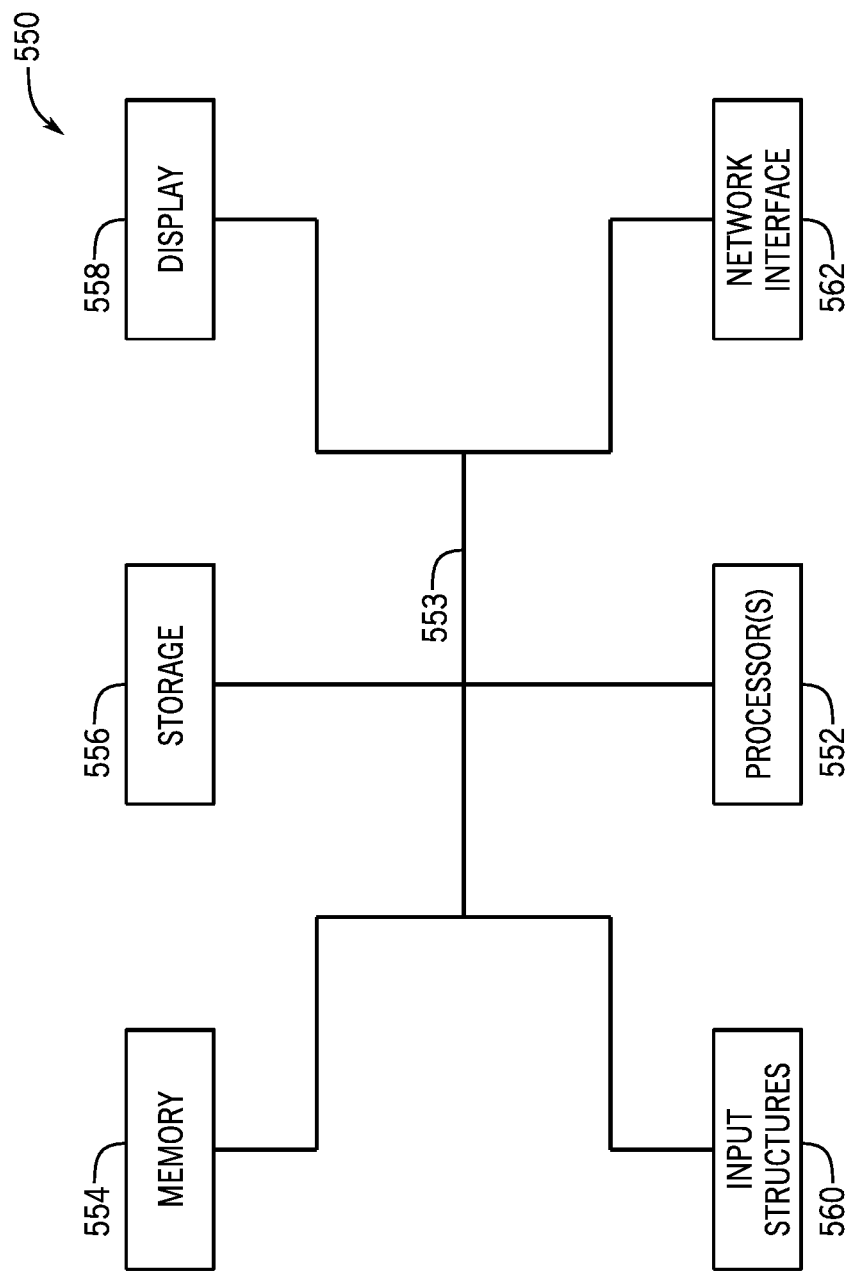
FIG. 4 depicts a block diagram of a monitoring and control system that may be used to monitor and control an electric power delivery system, in accordance with an embodiment.

With the foregoing in mind, FIG. 4 is a block diagram of a monitoring and control system 550 that may be used to monitor and control the electric power delivery systems 100 or 250 (e.g., the monitoring and control systems 108 and 468). The monitoring and control system 550 may be located at any suitable location, such as at a power plant of the electrical power delivery systems 100 and 250 or at another facility. The monitoring and control system 550 may include one or more electronic device(s) according to an embodiment of the present disclosure, which may include, among other things, one or more processor(s) 552, memory 554, nonvolatile storage 556, a display 558, input structures 560, and network interface 562.

The various functional blocks shown in FIG. 4 may include hardware elements (including circuitry), software elements (including computer code stored on a computer-readable medium) or a combination of both hardware and software elements. It should be noted that FIG. 4 is merely one example of a particular implementation and is intended to illustrate the types of components that may be present in the monitoring and control system 550. The processor 552 may be a single contained processing module or may be incorporated wholly or partially within any of the other elements within the monitoring and control system 550.

In the monitoring and control system 550 of FIG. 4, the processor 552 may be operably coupled, via one or more communication buses 553, with the memory 554 and/or the nonvolatile storage 556 to perform various operations. Such programs or instructions executed by the processor 552 may be stored in any suitable article of manufacture that includes one or more tangible, computer-readable media at least collectively storing the instructions or routines, such as the memory 554 and the nonvolatile storage 556. The memory 554 and the nonvolatile storage 556 may include any suitable articles of manufacture for storing data and executable instructions, such as random-access memory, read-only memory, rewritable flash memory, hard drives, and optical discs.

In some embodiments, the nonvolatile storage 556 or the processor 552 may be implemented as hardware components, such as via discrete electrical components, via a field programmable gate array (FPGA) or via one or more application specific integrated circuits (ASICs), and may be referred to generally as processing circuitry. Further, the instructions or routines may be provided to the processor 552 to produce a machine, such that the instructions, when executed by the processor 552, implement the operations/acts specified in the flowchart described below with respect to FIG. 4.

The input structures 560 may enable a user to interact with the monitoring and control system 550 via the display 558. The display 558 may be any suitable display that allows users to view images generated on the monitoring and control system 550, such as a liquid crystal display (LCD), organic light emitting diode (OLED) display, or the like.

According to various embodiments, the monitoring and control system 550 may comprise one or more of a variety of types of systems, such as a supervisory control and data acquisition (SCADA) system, a power management system (PMS), or a wide area control and situational awareness (WACSA) system. The monitoring and control system 550 may provide control operations for the electric power delivery system 20 (e.g., signals to reduce power consumption of one or more loads, increase power consumption of one or more generators, or both).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure. Moreover, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory computer readable medium comprising instructions that, when executed by a processor, cause performing operations comprising:
    receiving electrical measurements of a power system comprising a first island, a second island, and a reactor, wherein the first island is coupled to the second island via the reactor, and wherein the first island comprises at least a first generator and at least a first load, and the second island comprises at least a second generator and at least a second load;
    detecting a current flow across the reactor between the first island and the second island higher than a threshold current flow based on the electrical measurements; and
    reducing the current flow across the reactor and between the first island and the second island by adjusting reactive power production of the first generator or the second generator or adjusting reactive power consumption of the first load or the second load based on the current flow being higher than the threshold current flow.

2. The non-transitory computer readable medium of claim 1, wherein adjusting the reactive power consumption comprises increasing the reactive power consumption of the first load on the first island.

3. The non-transitory computer readable medium of claim 1, wherein adjusting the reactive power consumption comprises decreasing the reactive power consumption of the second load.

4. The non-transitory computer readable medium of claim 1, wherein adjusting the reactive power production comprises increasing the reactive power production of the first generator.

5. The non-transitory computer readable medium of claim 1, wherein adjusting the reactive power consumption of the first load or the second load comprises transmitting control signals to respective active front end circuitry associated with the first load or the second load to increase or decrease delivery of the reactive power to the first load or the second load.

6. The non-transitory computer readable medium of claim 1, wherein the operations comprise reducing the current flow across the reactor by adjusting active power consumption of the first load or the second load.

7. The non-transitory computer readable medium of claim 1, wherein the operations comprise reducing the current flow across the reactor by adjusting active power production of the first generator or the second generator.

8. The non-transitory computer readable medium of claim 1, wherein detecting the current flow across the reactor is based on measuring a reactive power flow across the reactor based on receiving an indication of an active power production of the first generator or the second generator and an active power consumption of the first load and the second load.

9. The non-transitory computer readable medium of claim 1, wherein detecting the current flow across the reactor comprises:
   obtaining voltages of power transmission buses associated with the first island and the second island;
   obtaining reactive power flow of the power transmission buses associated with the first island and the second island;
   obtaining active power flow of the power transmission buses associated with the first island and the second island; and
   determining a difference between a real power flow, reactive power flow, and voltages of the power transmission buses associated with the first island and the second island.

10. A system, comprising:
   a memory; and
   a processor operatively coupled to the memory, wherein the processor is configured to:
      receive electrical measurements of a power system comprising a first island and a second island, wherein the first island is coupled to the second island, and wherein the first island comprises at least a first generator and at least a first load, and the second island comprises at least a second generator and at least a second load;
      determine whether a current flow between the first island and the second island is higher than a threshold based on the electrical measurements; and
      control reactive power production of the first generator or the second generator and reactive power consumption of the first load or the second load to reduce the current flow between the first island and the second island in response to determining that the current flow is higher than the threshold.

11. The system of claim 10, wherein the processor is configured to control active power production and active power consumption of the power system to reduce the current flow between the first island and the second island in response to determining that the current flow is higher than the threshold.

12. The system of claim 10, wherein the processor is configured to determine that the current flow higher than the threshold flows from the first island to the second island.

13. The system of claim 12, wherein the processor is configured to control the reactive power consumption of the power system by increasing a reactive power consumption of the first load or reducing a reactive power production of the first generator disposed on the first island.

14. The system of claim 12, wherein the processor is configured to control the reactive power consumption of the power system by reducing a reactive power consumption of the second load or increasing a reactive power production of the second generator.

15. The system of claim 10, wherein the power system comprises a third island coupled to the second island, wherein the third island comprises at least a third generator and at least a third load, wherein the processor is configured to:
   receive second electrical measurements of the power system:
   determine whether a second current flow between the third island and the second island is higher than the threshold based on the second electrical measurements; and
   control the reactive power production of the second generator or the third generator, reactive power consumption of the second load or the third load to reduce the second current flow between the third island and the second island in response to determining that the second current flow between the third island and the second island is higher than the threshold.

16. A method, comprising:
   receiving electrical measurements of a power system comprising a first island, a second island, and a reactor, wherein the first island is coupled to the second island via the reactor, and wherein the first island comprises at least a first generator and at least a first load, and the second island comprises at least a second generator and at least a second load;
   determining that a current flow across the reactor between the first island and the second island is higher than a threshold based on the electrical measurements; and
   reducing the current flow across the reactor and between the first island and the second island by adjusting reactive power production of the first generator or the second generator or adjusting reactive power consumption of the first load or the second load in response to determining that the current flow is higher than the threshold.

17. The method of claim 16, wherein adjusting the reactive power production of the power system comprises increasing the reactive power production of the first generator or the second generator.

18. The method of claim 16, wherein adjusting the reactive power consumption of the power system comprises increasing the reactive power consumption of the first load or the second load.

19. The method of claim 16, comprising reducing the current flow across the reactor by adjusting active power production and active power consumption of the power system in response to determining that the current flow across the reactor is higher than the threshold.

20. The method of claim 16, wherein the threshold of the current flow is based on an operating rating of the reactor.

* * * * *